(12) United States Patent
Drzymala

(10) Patent No.: US 8,618,468 B2
(45) Date of Patent: Dec. 31, 2013

(54) IMAGING MODULE WITH FOLDED ILLUMINATING AND IMAGING PATHS

(75) Inventor: Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 474 days.

(21) Appl. No.: 12/215,795

(22) Filed: Jun. 30, 2008

(65) Prior Publication Data
US 2009/0321614 A1 Dec. 31, 2009

(51) Int. Cl.
*H01J 5/02* (2006.01)
*G06M 7/00* (2006.01)

(52) U.S. Cl.
USPC .......................................... 250/239; 250/221

(58) Field of Classification Search
USPC ........... 250/208.1, 239, 216, 227.2, 221, 566; 235/462.01, 472.01, 472.02, 472.03, 235/462.41, 462.42; 358/501, 505, 509, 358/513, 514, 470–474, 482–483; 382/182–184
See application file for complete search history.

(56) References Cited

U.S. PATENT DOCUMENTS

| | | | |
|---|---|---|---|
| 4,034,230 A * | 7/1977 | Brill et al. ..................... | 250/568 |
| 4,613,895 A | 9/1986 | Burkey et al. | |
| 4,794,239 A | 12/1988 | Allais | |
| 5,304,786 A | 4/1994 | Pavlidis et al. | |
| 5,703,349 A | 12/1997 | Meyerson et al. | |
| 6,160,250 A * | 12/2000 | Miksch et al. ............. | 250/208.1 |
| 6,164,544 A * | 12/2000 | Schwartz et al. ......... | 235/462.43 |
| 6,398,112 B1 * | 6/2002 | Li et al. .................... | 235/462.01 |
| 6,410,931 B1 * | 6/2002 | Dvorkis et al. ............... | 250/566 |
| 6,637,660 B2 * | 10/2003 | Yomogida et al. ........ | 235/472.01 |
| 6,764,008 B2 * | 7/2004 | Tsikos et al. .............. | 235/462.01 |
| 2003/0062413 A1 * | 4/2003 | Gardiner et al. .............. | 235/454 |
| 2008/0035732 A1 * | 2/2008 | Vinogradov et al. .... | 235/462.42 |

FOREIGN PATENT DOCUMENTS

| | | |
|---|---|---|
| EP | 1469413 | 9/2006 |
| WO | 9719416 | 5/1997 |
| WO | 2010002599 | 1/2010 |

OTHER PUBLICATIONS

International Search Report and Written Opinion dated Nov. 20, 2009 in related case PCT/US2009/047753.
International Preliminary Report on Patentability and Written Opinion for International Patent Application No. PCT/US2009/047753 issued on Jan. 5, 2011.
Office Action dated Mar. 1, 2013 in counterpart China application 200980125119.9.

* cited by examiner

*Primary Examiner* — Que T Le
*Assistant Examiner* — Jennifer Bennett
(74) *Attorney, Agent, or Firm* — Nong-Qiang Fan

(57) ABSTRACT

An imaging module for imaging, and a reader for and a method of electro-optically reading, a target, include a support, an imaging assembly including a solid-state imager having an array of image sensors on the support for capturing return light over a field of view at a range of working distances from the target along a folded imaging path, and an illuminating assembly on the support for directing illumination light along a folded illuminating path having a length longer than the folded imaging path to uniformly illuminate the target with the illumination light. The longer length of the folded illuminating path enables the illuminating assembly to illuminate the target with more of the illumination light, and also enables the imaging assembly to capture more of the return light for increased imaging/reading performance.

9 Claims, 4 Drawing Sheets

IMAGING MODULE WITH FOLDED ILLUMINATING AND IMAGING PATHS

DESCRIPTION OF THE RELATED ART

Solid-state imaging systems or imaging readers, as well as moving laser beam readers or laser scanners, have both been used to electro-optically read targets, such as one-dimensional bar code symbols, particularly of the Universal Product Code (UPC) type, each having a row of bars and spaces spaced apart along one direction, as well as two-dimensional symbols, such as Code 49, which introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes an imaging module on which an imaging assembly is mounted. The imaging assembly includes a solid-state imager with a sensor array of cells or photosensors, which correspond to image elements or pixels in a field of view of the imager, and imaging elements for capturing return light scattered and/or reflected from the symbol being imaged, and for projecting the return light onto the sensor array to initiate capture of an image of the symbol. Such an imager may include a one- or two-dimensional charge coupled device (CCD) or a complementary metal oxide semiconductor (CMOS) device and associated circuits for producing and processing electronic signals corresponding to a one- or two-dimensional array of pixel information over the field of view.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

In order to increase the amount of the return light captured by the imager, especially in dimly lit environments, rather than relying solely on ambient light, the imaging module generally also includes an illuminating light assembly having one light source or a plurality of light sources, e.g., light emitting diodes (LEDs), and a plurality of illuminating elements, e.g., lenses and aperture stops, to uniformly illuminate the symbol with the illumination light for reflection and scattering therefrom as the return light.

As advantageous as the known imaging readers have been in reading symbols, the known illuminating light assembly has proven disadvantageous in uniformly illuminating a far-out symbol, which is located at a far end of a range of working distances relative to the reader, with sufficient light to be captured with sufficient intensity by the imager so as to generate an electrical signal of sufficient strength that can be processed to successfully read the far-out symbol. Further complicating the illuminating function is that it is desirable to mount the known illuminating light assembly on an imaging module of prescribed standardized dimensions, and there are constraints as to the number and location of elements comprising the known illuminating light assembly that can be accommodated within such standardized dimensions.

SUMMARY OF THE INVENTION

One feature of the present invention resides, briefly stated, in an imaging reader or module for, and a method of, imaging a target, such as one-dimensional symbols. The reader or module includes a support; an imaging assembly including a solid-state imager having an array of image sensors on the support, for capturing return light over a field of view at a range of working distances from the target along a folded imaging path; and an illuminating assembly on the support, for directing illumination light along a folded illuminating path having a length longer than the folded imaging path to uniformly illuminate the target with the illumination light.

In accordance with one aspect of this invention, the longer the length of the folded illuminating path, the lower the f-number (also called the focal ratio equal to the focal length divided by the diameter of the entrance pupil of the illuminating assembly), the greater the amount of the illumination light that is directed to the target, and the greater the amount of the return light that is reflected and/or scattered from the target for capture by the imager. The increased throughput of the illumination light enhances the imaging/reading performance, especially for reading far-out symbols located far from the reader or module.

The support preferably includes a generally planar printed circuit board (PCB) on which the imager, preferably a linear, unpackaged array, is mounted, and a generally parallelepiped, box-like chassis having a generally planar base mounted below, and parallel to, the PCB. The linear imager is preferably a CCD or a CMOS, preferably having about 1500 image sensors arranged along a single row. The illuminating assembly includes a plurality of illumination light sources, preferably a pair of light emitting diodes, mounted on the PCB.

The PCB has an inner surface directly facing the base. The imager is mounted on the inner surface for capturing the return light in a direction generally perpendicular to the PCB. The illumination light sources are also mounted on the inner surface for directing the illumination light in the direction generally perpendicular to the PCB. The support also includes a front through which the illumination light passes to, and the return light passes from, the target. The illumination light sources are mounted on the inner surface further from the front than the imager is mounted to lengthen the folded illuminating path. The unpackaged linear array provides more room on the PCB to accommodate the illumination light sources thereon further from the front of the support.

The illuminating assembly includes a plurality of illumination reflectors for folding the illumination light from the illumination light sources in a horizontal direction generally parallel to the PCB and through the front of the support, and the imaging assembly also includes an imaging reflector for folding the captured return light from the target through the front of the support in a vertical direction generally perpendicular to the PCB. The illuminating assembly also includes a plurality of aperture stops for controlling the amount of the illumination light directed to the target, and a plurality of illuminating lenses for focusing the illumination light on the target.

The generally parallelepiped shaped chassis, together with the PCB, has standardized length, width, and height dimensions. For example, the length is 21 millimeters, the width is 15 millimeters, and the height is 11 millimeters. This form factor for the module is recognized as an industry standard whose dimensions are not to be exceeded.

In accordance with another feature of this invention, an electrical connector is mounted on an outer surface of the PCB, but still within the above-described form factor. In this embodiment, a microprocessor is advantageously mounted on the outer surface of the PCB, and the electrical connector is operative for conveying decoded digital signals from the microprocessor away from the module. For an even smaller form factor, the electrical connector may be mounted on the inner surface of the PCB and accommodated in a recessed area of the chassis. In this latter embodiment, the microprocessor is mounted remotely from the module, and the electrical connector is operative for conveying undecoded signals away from the module to the remote microprocessor.

The method of imaging a target is advantageously performed by capturing return light with an imaging assembly including a solid-state imager having an array of image sensors over a field of view at a range of working distances from the target along a folded imaging path, by directing illumination light from an illuminating assembly along a folded illuminating path having a length longer than the folded imaging path to uniformly illuminate the target with the illumination light, and by mounting the illuminating assembly and the imaging assembly on a support. The longer length of the folded illuminating path enables the illuminating assembly to illuminate the target with more of the illumination light, and also enables the imaging assembly to capture more of the return light for increased imaging/reading performance.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
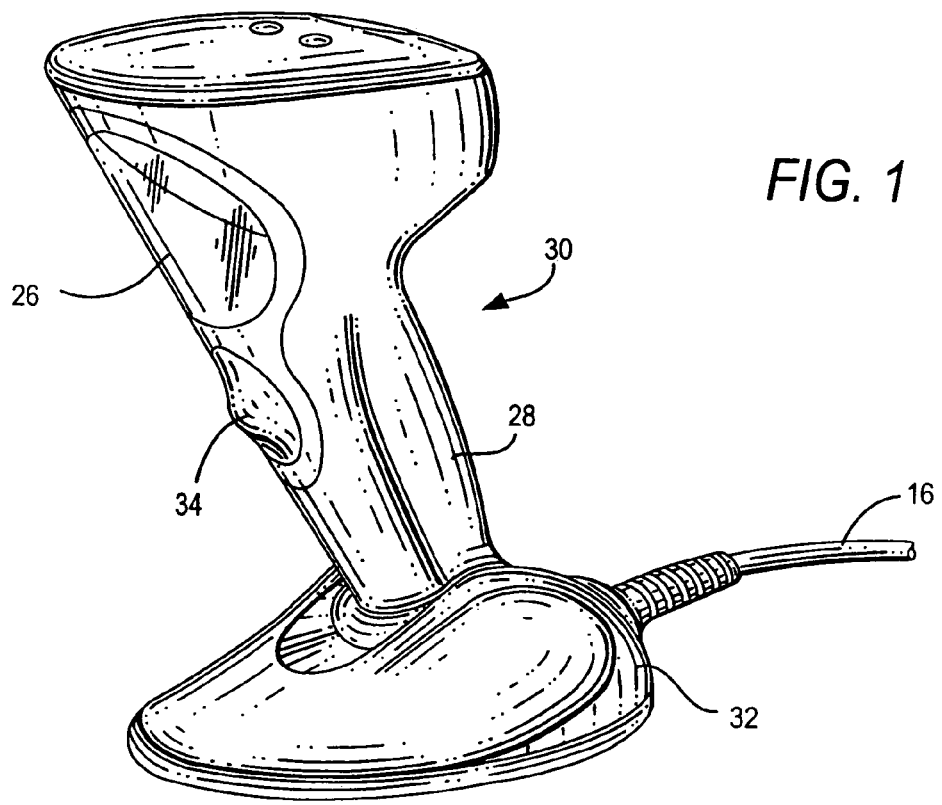
FIG. 1 is a perspective view of a portable imaging reader operative in either a handheld mode, or a hands-free mode, for capturing return light from target symbols.

Reference numeral 30 in FIG. 1 generally identifies an imaging reader having a generally vertical presentation area or window 26 and a gun-shaped housing 28 supported by a base 32 for supporting the imaging reader 30 on a countertop or analogous support surface. The imaging reader 30 can thus be used in a hands-free mode as a stationary workstation in which products bearing target symbols to be imaged and read are slid, swiped past, or presented to, the vertical window 26, or can be picked up off the countertop and held in an operator's hand and used in a handheld mode in which a trigger 34 is manually depressed to initiate imaging of indicia, especially one-dimensional symbols, to be read at working distances from the window 26. In another variation, the base 32 can be omitted, and housings of other configurations can be employed. A cable 16, as illustrated in FIG. 1, connected to the base 32 can also be omitted, in which case, the reader 30 communicates with a remote host by a wireless link, and the reader is electrically powered by an on-board battery.

Figure 2:
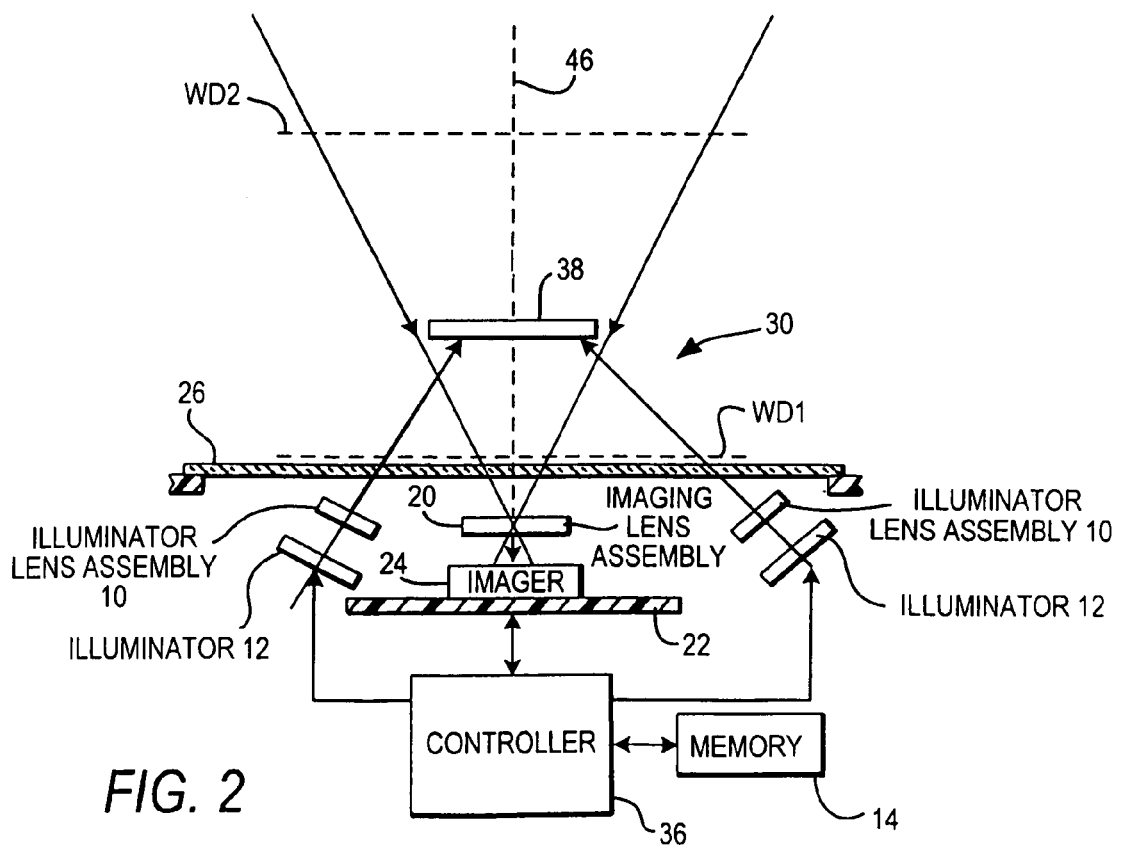
FIG. 2 is a schematic diagram of various components of the reader of FIG. 1.
Figure 3:
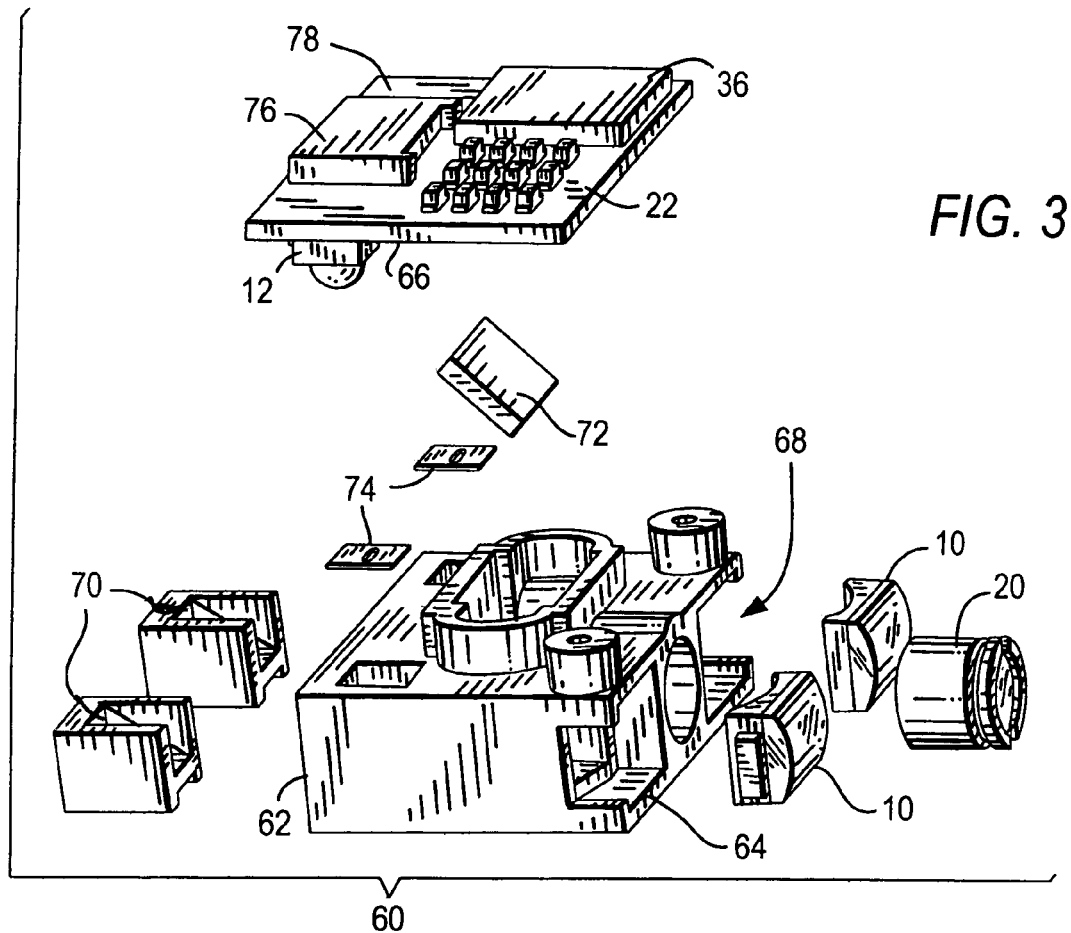
FIG. 3 is an exploded perspective view of the components of FIG. 2 arranged in an imaging module in a standardized form factor for use in the reader of FIG. 1 in accordance with one embodiment of the present invention.

As schematically shown in FIG. 2, an imaging assembly includes an imager 24 mounted on a printed circuit board (PCB) 22 in the reader. The imager 24 is a solid-state device, for example, a CCD or a CMOS imager, especially an unpackaged chip, and has a one-dimensional linear array of addressable image sensors or pixels, preferably 1500 in number, arranged in a single row, and operative for detecting return light captured by an imaging lens assembly 20 along an imaging path 46 through the window 26. The return light is scattered and/or reflected from a target or symbol 38 over a field of view on the order of 40 degrees. The imaging lens assembly 20, preferably comprising a plurality of lenses, such as a Cooke triplet, together with an aperture stop, having a focal length of about 8 millimeters, is mounted in a cylindrical barrel and is operative for adjustably focusing the return light onto the array of image sensors to enable the symbol 38 to be read. The barrel extends along an axis and is axially adjusted and held in a fixed position, preferably by an adhesive, during assembly. The symbol 38 may be located anywhere in a working range of distances between a close-in working distance (WD1) and a far-out working distance (WD2). In a preferred embodiment, WD1 is about four to six inches from the imager array 24, and WD2 can be many feet from the window 26, for example, around fifty feet away.

An illuminating assembly is also mounted in the imaging reader and preferably includes a plurality of illuminators or illumination light sources 12, e.g., light emitting diodes (LEDs), and a plurality of illuminator lens assemblies 10, one for each LED 12. The illuminating assembly directs illumination light along an illuminating path to uniformly illuminate the symbol 38.

A non-illustrated aiming assembly may also be mounted in the imaging reader and preferably includes one aiming light source or a plurality of aiming light sources, such as aiming lasers, and an aiming lens assembly for generating an aiming beam pattern. The aiming lens assembly may include a plurality of aiming elements, such as lenses for collimating laser beams generated by the lasers, and a plurality of pattern-generating elements, each pattern-generating element being a diffractive optical element, a holographic element, a Fresnel element, or a refractive optical element, for optically modifying the respective collimated laser beams to generate a visible aiming light pattern on the target. In the embodiment shown, the illuminating assembly serves as the aiming assembly.

As shown in FIG. 2, the imager 24 and the illuminators 12 are operatively connected to a controller or microprocessor 36 operative for controlling the operation of these components. A memory 14 is connected and accessible to the controller 36. Preferably, the microprocessor is the same as the one used for processing the return light from the target symbols 38 and for decoding the captured target images.

In operation, the microprocessor 36 sends a command signal to pulse the illuminators 12 for a short exposure time period, say 500 microseconds or less, and energizes and exposes the imager 24 to collect return light, e.g., illumination light and/or ambient light, from a target symbol 38 only during said exposure time period. A typical array needs about 33 milliseconds to acquire the entire target image and operates at a frame rate of about 30 frames per second.

The arrangement of components in FIG. 2 is merely schematic. In accordance with one embodiment of this invention, as shown in FIGS. 3-6, the components of FIG. 2 are mounted on a compact imaging module 60 having a form factor standardized to fit in diverse housings of different shapes. The standardized form factor measures about 21 millimeters in length by about 15 millimeters in width by about 11 millimeters in height. The module 60 includes a support having a generally parallelepiped, box-like chassis 62, preferably made of a diecast material, and the PCB 22 mounted on, and closing the top of, the chassis 62, for supporting the illuminating and imaging assemblies. The PCB 22 is preferably bonded to the chassis 62 and creates a dust seal around the imager 24. The chassis 62 has a generally planar base 64 mounted below, and parallel to, the PCB 22.

Figure 4:
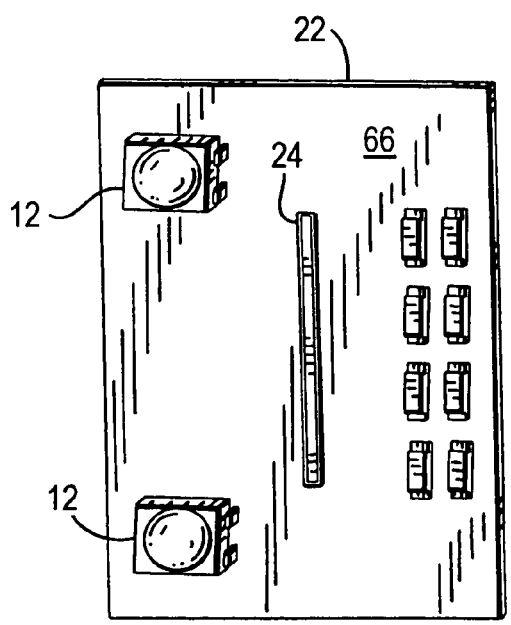
FIG. 4 is a bottom plan view of the underside of a printed circuit board used in the module of FIG. 3 after assembly.
Figure 5:
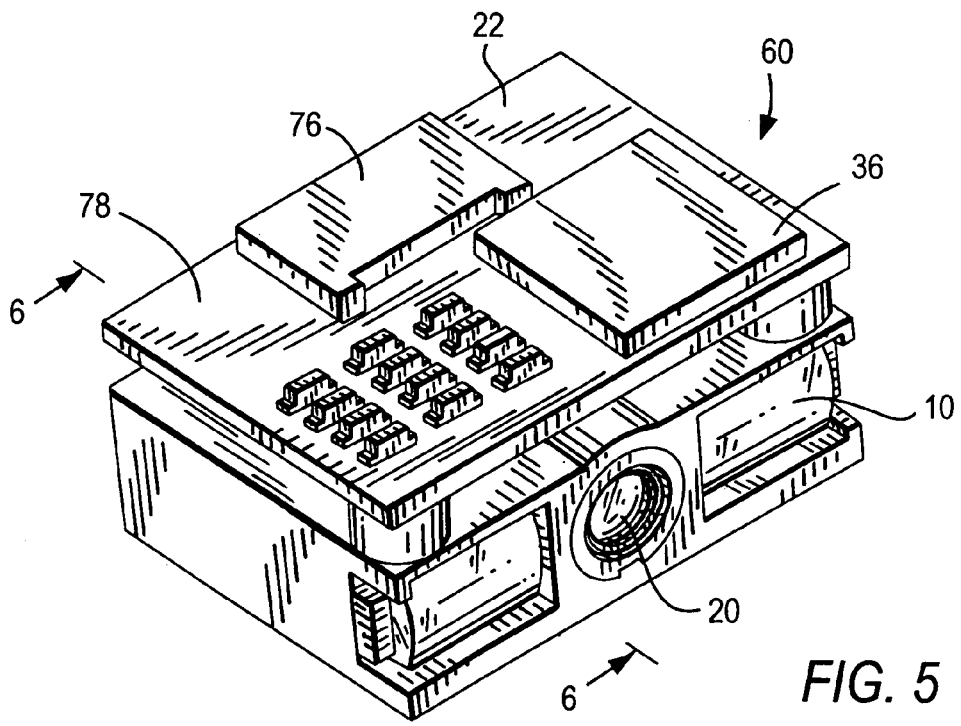
FIG. 5 is a perspective view of the module of FIG. 3 after assembly.
Figure 6:
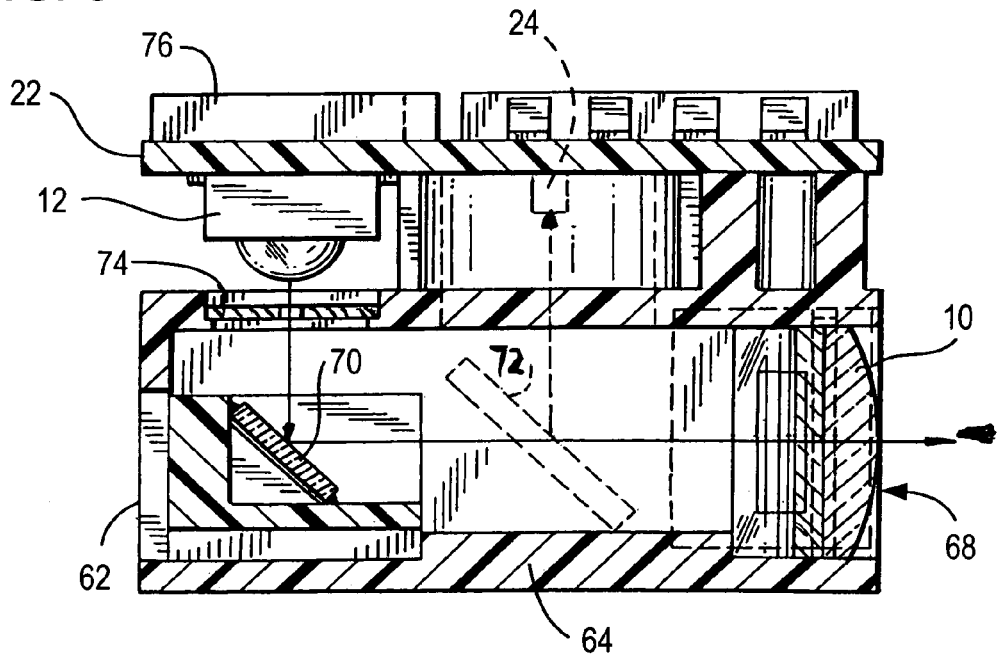
FIG. 6 is a sectional view taken on line 6-6 of FIG. 5.

The PCB 22 has an inner or lower surface 66 directly facing the base 64. As best seen in FIG. 4, the unpackaged imager 24 is mounted on the inner surface 66 of the PCB 22 for capturing the return light in a vertical direction generally perpendicular to the PCB 22. The illumination light sources 12 are also mounted on the inner surface 66 for directing the illumination light in the vertical direction generally perpendicular to the PCB 22. The support also includes a front 68 through which the illumination light passes to, and the return light passes from, the target symbol. The illumination light sources 12 are mounted on the inner surface 66 further from the front 68 than the imager 24 is mounted. The unpackaged imager 24 provides more room on the PCB 22 to accommodate the illumination light sources 12 thereon further from the front 68 of the support.

The illuminating assembly includes a plurality of illumination reflectors 70 for folding the illuminating path by redirecting the illumination light from the illumination light sources 12 from an initial vertical direction generally perpendicular to the PCB 22 to a horizontal direction generally parallel to the PCB 22 and through the front 68 of the support. Each reflector 70 includes a mirror mounted at a 45 degree angle relative to the horizontal direction and held in a carrier mounted for sliding movement on the base 64 to adjust the position of the mirror during assembly. Once adjusted, the carrier is fixed in position, preferably by an adhesive. The imaging assembly also includes an imaging reflector 72 for folding the imaging path by redirecting the captured return light from the target through the front 68 of the support in a horizontal direction generally parallel to the PCB 22 to a vertical direction generally perpendicular to the PCB 22. The imaging reflector 72 is a mirror mounted at a 45 degree angle relative to the horizontal direction and held in a fixed position, preferably by an adhesive. The illuminating assembly also includes a plurality of aperture stops 74 for controlling the amount of the illumination light directed to the target symbol. The illuminating lenses 10, preferably made of an injection molded polycarbonate material, focus the illumination light on the target symbol.

In accordance with one aspect of this invention, the longer the length of the folded illuminating path, the lower the f-number (also called the focal ratio equal to the focal length divided by the diameter of the entrance pupil of the illuminating assembly), the greater the size of the aperture stops 74, the greater the amount of the illumination light that is directed to the target, and the greater the amount of the return light that is reflected and/or scattered from the target for capture by the imager. The increased throughput of the illumination light enhances the imaging/reading performance, especially for reading far-out symbols located far from the reader or module.

In accordance with another feature of this invention, an electrical connector 76, preferably of the zero insertion type, is mounted on an outer surface 78 of the PCB 22, but still within the above-described form factor. In this embodiment, as shown for the module of FIGS. 3-6, the microprocessor 36 is advantageously mounted on the outer surface 78 of the PCB 22, and the electrical connector 70 is operative for conveying decoded digital signals from the microprocessor 36 away from the module 60.

Figure 7:
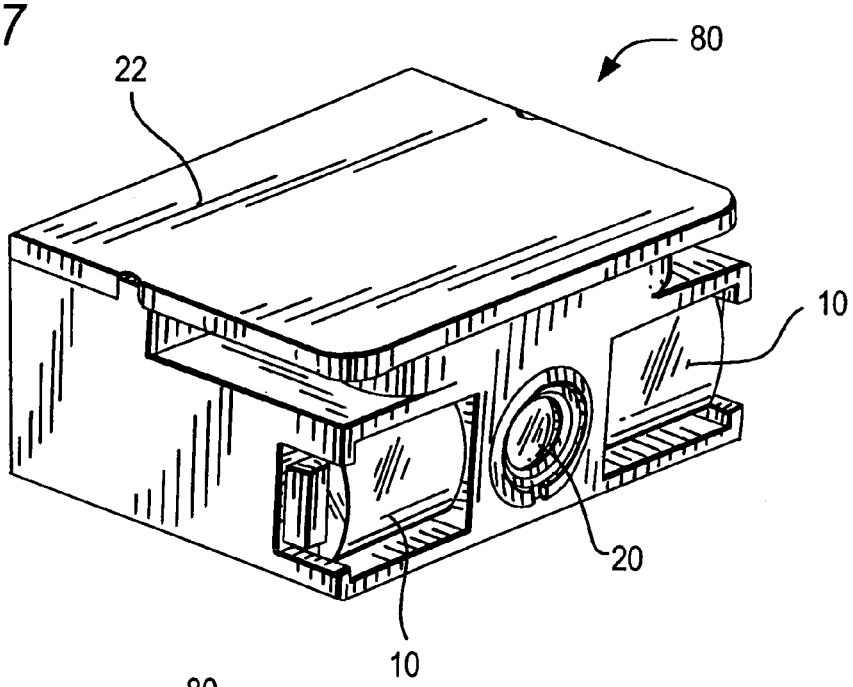
FIG. 7 is a front perspective view of another embodiment of an assembled imaging module for use in the reader of FIG. 1 in accordance with the present invention.
Figure 8:
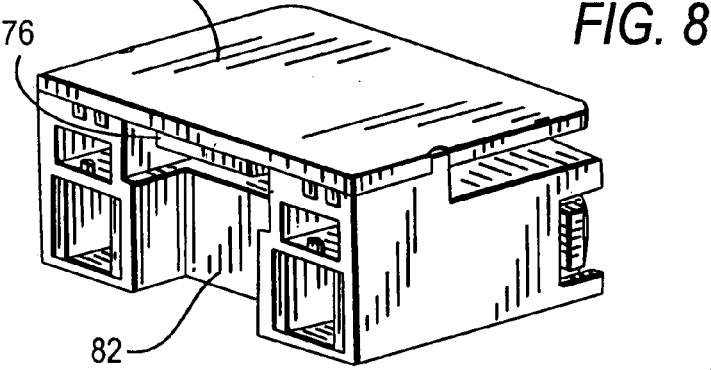
FIG. 8 is a top, rear perspective view of the module of FIG. 7.
Figure 9:
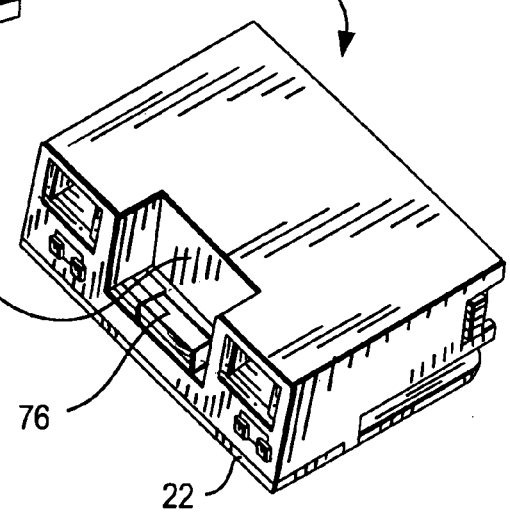
FIG. 9 is a bottom, rear perspective view of the module of FIG. 7.

For an even smaller form factor in which the height dimension is reduced to 9 millimeters, as shown for another embodiment of the module 80 depicted in FIGS. 7-9, the electrical connector 76 may be mounted on the inner surface 66 of the PCB 22 and be accommodated in a recessed area 82 of the chassis. In this latter embodiment, the microprocessor 36 is mounted remotely from the module 80, and the electrical connector 76 is operative for conveying undecoded signals away from the module 80 to the remote microprocessor 36. No components are mounted on the outer surface 78 of the PCB 22 in this latter embodiment.

It will be understood that each of the elements described above, or two or more together, also may find a useful application in other types of constructions differing from the types described above.

While the invention has been illustrated and described as an imaging reader or module having folded illuminating and imaging paths, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An imaging module for imaging a barcode on a target, comprising: a support having a front; an imaging assembly including a solid-state imager having an array of image sensors on the support, for capturing return light over a field of view at a range of working distances from the barcode on the target along an imaging path; an illuminating assembly including at least one aperture stop and at least one illuminating lens and at least one illumination light source on the support, wherein each of the least one illumination light source is located further from the front of the support than the solid-state imager for directing illumination light through the at least one aperture stop followed by the at least one illuminating lens along a folded illuminating path having a length longer than the imaging path to uniformly illuminate the barcode on the target with the illumination light, the longer length of the folded illuminating path enabling the illuminating assembly to illuminate the barcode on the target with more of the illumination light and enabling the imaging assembly to capture more of the return light for increased imaging performance; wherein the support includes a printed circuit board on which the imager is mounted; wherein the support has a generally planar base, wherein the printed circuit board has an inner surface directly facing the base, and wherein the imager is mounted on the inner surface for capturing the return light in a direction generally perpendicular to the printed circuit board, and wherein the at least one illumination light source is mounted on the inner surface for directing the illumination light in the direction generally perpendicular to the printed circuit board; and wherein the printed circuit board is generally planar and overlies the base in mutual parallelism; and wherein the illuminating assembly includes a plurality of illumination reflectors for folding the illumination light from the illumination light sources in a direction generally parallel to the printed circuit board, and wherein the imaging assembly includes an imaging reflector for folding the captured return light from the barcode on the target in a direction generally perpendicular to the printed circuit board.

2. The module of claim 1, wherein the array of image sensors is a linear, unpackaged array, and wherein the illumination light sources are light emitting diodes.

3. The module of claim 1, wherein the front is through which the illumination light passes to, and the return light passes from, the barcode on the target; and wherein the illumination light sources are mounted on the inner surface further from the front than the imager is mounted to lengthen the folded illuminating path.

4. The module of claim 1, wherein the illuminating assembly includes a plurality of aperture stops for controlling an amount of the illumination light directed to the barcode on the target, and a plurality of illuminating lenses for focusing the illumination light on the barcode on the target.

5. The module of claim 1, wherein the support has a generally parallelepiped shape with standardized length, width, and height dimensions.

6. The module of claim 1, wherein the printed circuit also has an opposite outer surface; and further comprising an electrical connector mounted on the outer surface of the printed circuit board.

7. The module of claim 1, wherein the support includes a chassis having a recessed area; and further comprising an electrical connector mounted on the inner surface of the printed circuit board and accommodated in the recessed area of the chassis.

8. An imaging module for imaging a barcode on a target, comprising: support means including a from; imaging means including a solid-state imager having an array of image sensors on the support means, for capturing return light over a field of view at a range of working distances from the barcode on the target along an imaging path; illuminating means including at least one illumination light source on the support means, wherein each of the at least one illumination light source is located further from the front of the support means than the solid-state imager, for directing illumination light through at least one aperture stop followed by at least one illuminating lens along a folded illuminating path having a length longer than the imaging path to uniformly illuminate the barcode on the target with the illumination light, the longer length of the folded illuminating path enabling the illuminating means to illuminate the barcode on the target with more of the illumination light and enabling the imaging means to capture more of the return light for increased imaging performance; wherein the support means includes a printed circuit board on which the imager is mounted; wherein the support means has a generally planar base, wherein the printed circuit board has an inner surface directly facing the base, and wherein the imager is mounted on the inner surface for capturing the return light in a direction generally perpendicular to the printed circuit board, and wherein the at least one illumination light source is mounted on the inner surface for directing the illumination light in the direction generally perpendicular to the printed circuit board; and wherein the printed circuit board is generally planar and overlies the base in mutual parallelism; and wherein the illuminating means includes a plurality of illumination reflectors for folding the illumination light from the illumination light sources in a direction generally parallel to the printed circuit board, and wherein the imaging assembly includes an imaging reflector for folding the captured return light from the barcode on the target in a direction generally perpendicular to the printed circuit board.

9. An imaging reader for electro-optically reading a barcode on a target, comprising: a housing; an imaging module supported by the housing, the module including a support having a front, an imaging assembly including a solid-state imager having an array of image sensors on the support for capturing return light over a field of view at a range of working distances from the barcode on the target along an imaging path, and an illuminating assembly including at least one aperture stop and at least one illuminating lens and at least one illumination light source on the support, wherein each of the at least one illumination light source is located further from the front of the support than the solid-state imager for directing illumination light through the at least one aperture stop followed by the at least one illuminating lens along a folded illuminating path having a length longer than the imaging path to uniformly illuminate the barcode on the target with the illumination light, the longer length of the folded illuminating path enabling the illuminating assembly to illuminate the barcode on the target with more of the illumination light and enabling the imaging assembly to capture more of the return light for increased reading performance; wherein the support includes a printed circuit board on which the imager is mounted; wherein the support has a generally planar base, wherein the printed circuit board has an inner surface directly facing the base, and wherein the imager is mounted on the inner surface for capturing the return light in a direction generally perpendicular to the printed circuit board, and wherein the at least one illumination light source is mounted on the inner surface for directing the illumination light in the direction generally perpendicular to the printed circuit board; and wherein the printed circuit board is generally planar and overlies the base in mutual parallelism; and wherein the illuminating assembly includes a plurality of illumination reflectors for folding the illumination light from the illumination light sources in a direction generally parallel to the printed circuit board, and wherein the imaging assembly includes an imaging reflector for folding the captured return light from the barcode on the target in a direction generally perpendicular to the printed circuit board.

* * * * *